US012240739B2

(12) United States Patent
Green et al.

(10) Patent No.: US 12,240,739 B2
(45) Date of Patent: Mar. 4, 2025

(54) SYSTEM AND METHOD FOR INCREASING THE LOAD CARRYING CAPACITY OF A TELESCOPIC CRANE BOOM

(71) Applicant: Custom Truck One Source, Inc., Kansas City, MO (US)

(72) Inventors: Collin Green, Kansas City, MO (US); Kyle Gerber, Kansas City, MO (US)

(73) Assignee: Custom Truck One Source, Inc., Kansas City, MO (US)

( * ) Notice: Subject to any disclaimer, the term of this patent is extended or adjusted under 35 U.S.C. 154(b) by 0 days.

(21) Appl. No.: 18/057,279

(22) Filed: Nov. 21, 2022

(65) Prior Publication Data

US 2023/0278835 A1 Sep. 7, 2023

Related U.S. Application Data

(60) Provisional application No. 63/268,756, filed on Mar. 2, 2022.

(51) Int. Cl.
*B66C 23/70* (2006.01)

(52) U.S. Cl.
CPC .................................. *B66C 23/703* (2013.01)

(58) Field of Classification Search
CPC ............................ B66C 23/703; B66C 23/701
See application file for complete search history.

(56) References Cited

U.S. PATENT DOCUMENTS

| | | | | |
|---|---|---|---|---|
| 3,029,954 A * | 4/1962 | Grant | B66C 23/36 212/114 |
| 3,426,917 A * | 2/1969 | Siegel | B66C 23/36 212/264 |
| 3,638,806 A | 2/1972 | Wilburn | |
| 3,752,327 A | 8/1973 | Olson | |
| 3,845,596 A | 11/1974 | Veenstra | |
| 4,166,542 A * | 9/1979 | Bryan, Jr. | B66C 23/703 52/118 |
| 4,575,976 A | 3/1986 | McDermott et al. | |
| 6,199,707 B1 | 3/2001 | Suzki et al. | |
| 7,090,086 B2 | 8/2006 | Dupre et al. | |
| 9,452,913 B2 | 9/2016 | Dell | |

(Continued)

FOREIGN PATENT DOCUMENTS

| | | |
|---|---|---|
| CN | 113086870 | 7/2021 |
| JP | 4283385 B2 * | 6/2009 |
| JP | 2020152490 | 9/2020 |

OTHER PUBLICATIONS

CN 113086870 Machine Translation. (Year: 2021).*

(Continued)

*Primary Examiner* — Michael R Mansen
*Assistant Examiner* — Juan J Campos, Jr.
(74) *Attorney, Agent, or Firm* — Robert J. Lambrechts; Lathrop GPM LLP

(57) ABSTRACT

A telescopic boom that includes a plurality of extensible boom sections and a power source for delivering translational force to the boom sections. The boom further includes at least one rope transiting between boom sections wherein a first section is extending, and the second section is adjacent to the extending sections. The rope is redirected by at least one sheave mounted to the adjacent section and further redirected by at least one sheave mounted to the extensible section.

3 Claims, 4 Drawing Sheets

(56) References Cited

U.S. PATENT DOCUMENTS

| | | | | |
|---|---|---|---|---|
| 9,527,700 | B2 | 12/2016 | Gerber | |
| 9,815,669 | B2 | 11/2017 | Magni | |
| 2015/0239715 | A1* | 8/2015 | Gerber | B66C 23/703 212/348 |

OTHER PUBLICATIONS

JP 2020152490 Machine Translation. (Year: 2020).*
JP 4283385 B2 Machine Translation. (Year: 2009).*
Manitowoc, Supplemental to Service Manual Boom Cable Tensioning, Mar. 23, 2017—p. 3, col. 1, para 1-2 and p. 6, figure 3.

* cited by examiner

SYSTEM AND METHOD FOR INCREASING THE LOAD CARRYING CAPACITY OF A TELESCOPIC CRANE BOOM

RELATED APPLICATIONS

This application claims priority from U.S. Provisional Application No. 63/268,756 filed Mar. 2, 2022. The content of this application is incorporated herein by reference in its entirety.

FIELD OF THE DISCLOSURE

A system and method for increasing the load carrying capacity of a telescopic crane boom while maintaining the tension in the ropes therein below the safe tensile limit of the ropes.

BACKGROUND

Telescopic cranes are equipped with a boom (arm) outfitted with a hydraulic cylinder that allows it to change length, like a telescope. Many telescopic (extensible) cranes are mounted on a truck to transport to and from different worksites. Telescoping boom assemblies generally include a first longitudinal tube section attached to a mounting platform and a second longitudinal tube section that telescopes relative to the first longitudinal tube section. Additional longitudinal tube sections can be disposed within the second longitudinal tube section creating three or more extensible sections.

Multi-section telescopic booms traditionally utilize cables, often called wire ropes, to operate them. Wire ropes transfer the translational force of the telescoping cylinder to further sections not directly anchored to the cylinder. This configuration has served the crane industry well for many years; however, demands by customer to increase both load capacity and reach continue to challenge crane designers and fabricators.

The need for larger cables and sheaves to accommodate larger loads and increased reach require larger boom cross sections that provide greater space to install the larger cables and sheaves. At the same time, larger boom cross sections and wall thicknesses increase the overall weight of the boom which in turn require larger cables and sheaves that can accommodate the larger loads the sections are capable of supporting.

The ever-increasing demand for hydraulically operated telescoping cranes with increased load lifting capacity and the resulting increases in size of the telescoping booms has created a need for a less massive mechanism for extending the telescoping boom. The weak link in this race for more crane lifting capacity is a commensurate need for increased wire rope capacity. Alternatively, an approach must be developed to increase the load lifting capacity of the crane but not the tensile load experienced by the wire ropes.

SUMMARY OF THE INVENTION

The method of designing a telescoping boom system disclosed herein is directed to a system capable of lifting larger loads with ropes of the same breaking strength as traditional rope and sheave systems in telescoping booms. The method disclosed herein results in a telescoping boom crane system wherein the amount of force required to extend or keep a section of the crane extended under a certain load stays the same; however, the required wire rope breaking strength is lower than that used in a traditional rope system.

Because there is less tension in each rope with the method disclosed herein, the diameter of the ropes can be decreased to save weight, or the capacity of the extensible boom can be increased with the same diameter of rope. Decreasing the diameter of the ropes allows the diameter and thickness of the sheaves to be decreased as well. Smaller ropes and smaller sheaves mean the spacing between the sections can decrease and cross section sizes can be better optimized. This allows for larger lifting capacities without increasing the overall size of the boom package.

In a typical four section configuration of the system as disclosed herein, when hydraulic fluid is pumped into the extend cylinder two things happen. First, section two is driven outward by the movement of the cylinder barrel as the cylinder barrel is pinned to the second section. Second, section three is simultaneously pulled forward (outward away from section two) as the first rope rolls over the sheave attached to the distal end of the extend cylinder barrel.

It is important to appreciate the mechanical advantage of the rope system disclosed herein. For every one unit of travel of the second section, the third section travels two units with respect to the base section. This is because the second section travels one unit and then the third section travels one unit with respect to the second section. Therefore, cumulatively the third section travels two units. In a similar fashion, sheaves are anchored to the front of section three over which smaller wire ropes run. One end of this second rope is anchored to the tip section. The other end is anchored to section two. This second rope is lesser in diameter than the first rope because it carries less load than the first rope.

As mentioned previously, the tip section is extended by the second rope. The first end of the second rope is anchored to the first end of the tip section. The rope then wraps around a sheave at the front of the third section, and the second end anchors at the back end of the second section.

To understand the mechanism by which the tip section is propelled, it can be imagined that section two is fixed in space. If a force propels section three forward, the sheave over which the small rope runs would move forward as well. Movement of this sheave causes the tip section to be propelled forward since one end of the small rope is anchored to the fixed second section.

Note the pattern by which ropes are anchored and sheaves are located in a traditional four section boom extension system. The small rope which is attached to the tip section, runs over a sheave anchored to the third section, and then anchors to the second section. The pattern is 4-3-2. The large rope attached to the third section, runs over a sheave attached to the extend cylinder which is anchored to the second section, and then anchors to the base section. The pattern is 3-2-1.

For a five section boom, three sets of ropes would be required instead of the two sets used in a four section boom, but the attachment and anchor pattern is the same. With a five section boom the pattern for the tip section extend ropes would be 5-4-3. The first end of the first rope anchors to section five and the sheave is attached to the fourth section. The second end of the first rope anchors to section three.

The fourth section rope pattern is 4-3-2. The first end of the second rope anchors to section four while the sheave is attached to section three and the second end of the second rope anchors to section two. For the third section rope the pattern is 3-2-1. With the third section, the first end of the third rope anchors to section three. The sheave is attached to section two and the second rope end anchors to the first section.

In summary, for each section in a traditional boom extension system, the section to be extended is where the first end of the rope is anchored. Then the rope proceeds to run over a sheave attached to the section directly behind the extended section. The second end of the rope is then anchored two sections behind the extended section.

It is an object of the extensible boom innovation disclosed herein to provide greater overall crane capacity with lesser diameter ropes in concert with the single extending and retracting cylinder.

It is a further object of the extensible boom innovation disclosed herein to reduce the diameter and thickness of the sheaves in alignment with the lesser diameter of the ropes.

It is a further object of the extensible boom innovation disclosed herein to reduce the overall weight of the crane boom relative to prior art designs of a comparable load carrying capacity.

It is a further object of the extensible boom innovation to reduce the overall weight of the crane boom, lessen the rolling resistance of the tires and thereby increase the fuel economy of the truck transporting the crane boom and critically to reduce emissions of greenhouse gases from the truck.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

Wire rope boom extension systems have existed for many years. Within a classic (traditional) wire rope extension system, a series of ropes, that run over sheaves, (a pulley over which a cable wraps around) are positioned throughout the boom. These cables drive each boom section to move synchronously when a single translation apparatus, such as a hydraulic cylinder, is extended. In a typical four section wire rope boom, the rod of the extend cylinder is anchored to the base section of the boom and the barrel is anchored to the back of the second section. When the term rope is used in this disclosure it is contemplated that the term includes cables, synthetic rope, chain, engineered assemblies, or any other flexible components capable of transmitting large forces in tension.

Figure 1:
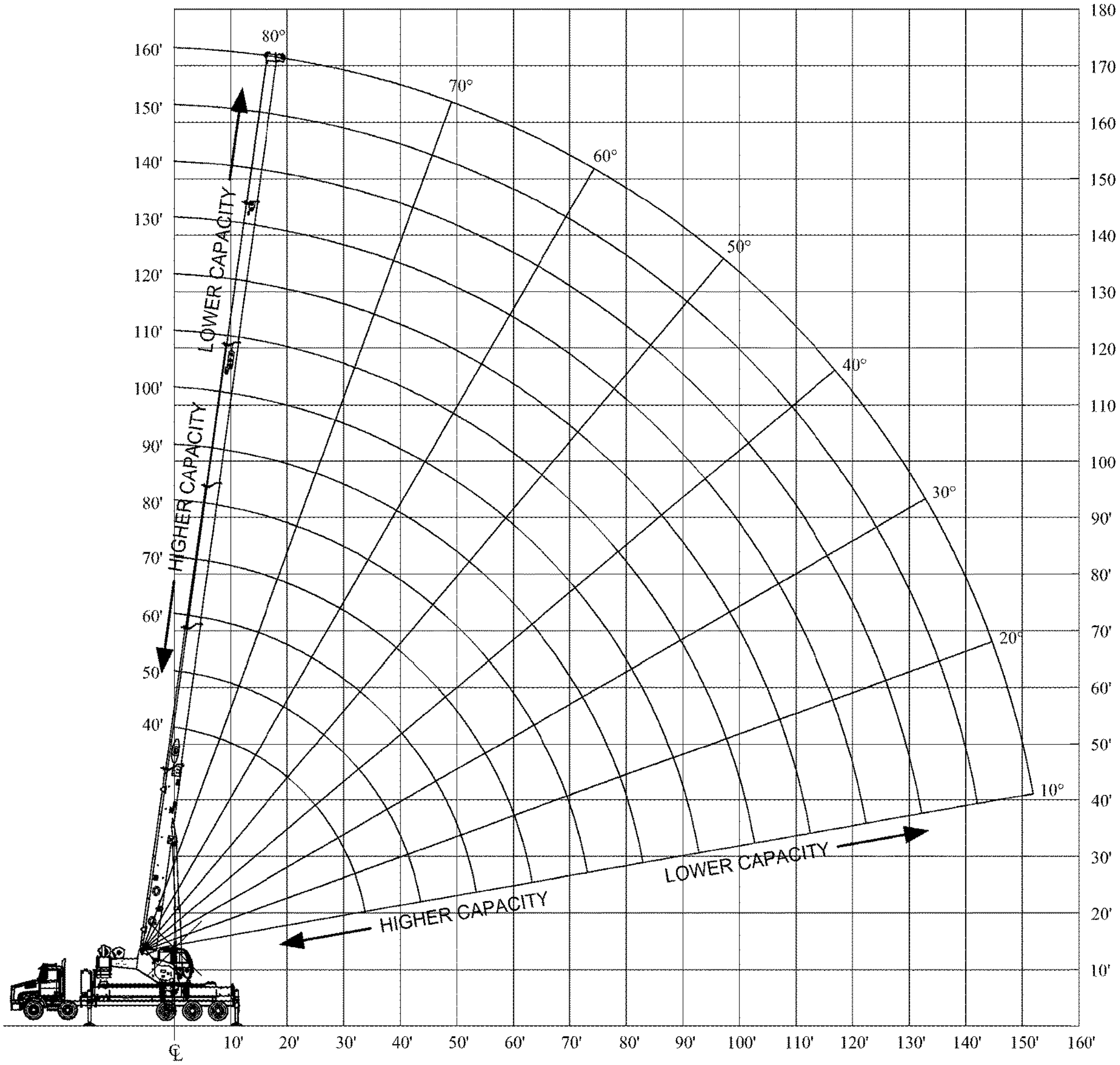
FIG. 1 illustrates an exemplary range diagram detailing articulation angle versus the load capacity on boom length.

While cranes are extremely versatile, they have limitations that must be carefully observed, or serious mishaps can result. FIG. 1 reveals a range diagram for a typical extensible boom crane. The chart reveals the limitations that exist on the extension of the boom and the load that can be carried by the boom based on the ability of the crane to carry the desired load without overloading the boom sections which include the ropes, sheaves and typically the hydraulic cylinder that provides the motive force. Additionally, the range diagram establishes limits that prevent tipping of the crane because of overextension of the boom. The information disclosed herein is directed to addressing a system for increasing the load capacity of the boom by reducing the tension carried by the ropes internal to the extension system to keep the boom extended.

It should be appreciated by the reader that in operational embodiments of the system disclosed herein, the wire rope and sheave configurations will be mirrored within each boom section. More precisely, to maximize the load carrying capacity of the wire rope and to capitalize upon the increased bending flexibility of lesser diameter wire rope, two identical wire rope and sheave systems are utilized in production embodiments. These identical wire rope and sheave systems are disposed opposite one another (on each side internal to the boom) in the extensible boom sections.

A single large wire rope with the same load carrying capacity as two smaller diameter ropes has a reduced capacity to flex around the redirection sheaves and hence two smaller, more flexible, wire ropes are preferable in a fully operational context. To facilitate full and clear disclosure of the system, the placement of only one side of the sheave and wire rope system will be discussed herein; however, as noted immediately above, it is contemplated that in a production setting the boom sections will each house two identical rope and sheave systems.

Figure 2:
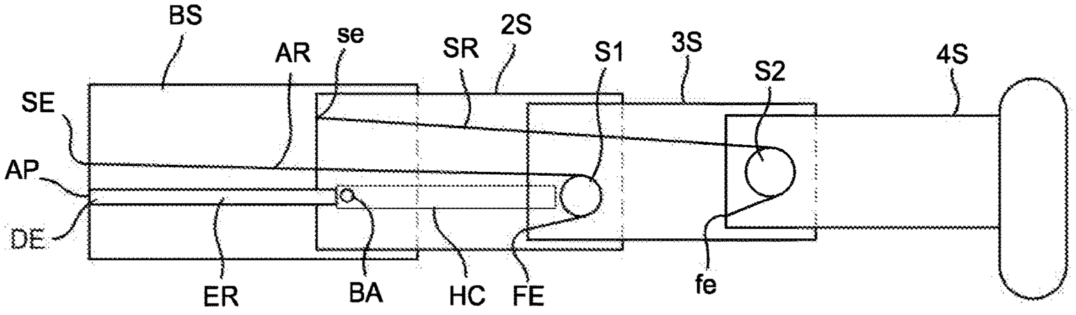
Fig. 2 (PRIOR ART)
FIG. 2 illustrates a sectional view of a prior art four-section telescoping boom detailing the location of ropes and sheaves.

FIG. 2 illustrates a longitudinal cross-sectional view, detailing the internal ropes and sheaves, of a prior art embodiment of a four-section telescopic boom system. The first boom system embodiment includes a base section, two intermediate sections and a tip section. The boom sections are traditionally fabricated in a wide range of cross-sectional shapes to include, among others, square, rectangular, and circular. Typically, the boom sections are fabricated from high strength steel and may span from six inches to many feet in cross-section and may span in length from a few feet to over thirty feet. The wall thickness of the boom sections must necessarily vary to accommodate the overall size and intended load carrying capacity of the boom system.

The prior art design illustrated in FIG. 2 includes a hydraulic cylinder HC, also known as the barrel, with an extensible rod ER. The distal end DE of the extensible rod ER is secured to an anchor point AP on or near the first end of the base section BS of the boom system. A proximal end of the hydraulic cylinder HC is securely pinned to the second intermediate section 2S of the boom system at a barrel anchor BA proximate the first end of the second section. As the extensible rod is extended outwardly from the cylinder HC under pressure from the hydraulic fluid, it longitudinally translates the second intermediate section 2S outwardly from the base section BS.

While the hydraulic cylinder HC and extensible rod ER for the application of translational force are utilized to separate the second section 2S from the base section BS, there are other operational elements within the boom sections that cause the other two boom sections 3S, 4S to undergo translation. FIG. 2 also illustrates the location of various sheaves that are facilitating extension of the boom sections. As previously discussed, the barrel anchor BA is located proximate the first end of the second intermediate section 2S. A first sheave S1 is secured to the distal end of the hydraulic cylinder HC and a second sheave S2 is secured proximate the second end of the third section 3S.

This prior art design as illustrated at FIG. 2 also utilizes ropes under tension to convey translational force to the various boom sections of the system to cause their movement. The prior art system of FIG. 2 utilizes an anchor rope AR with first and second ends FE, SE. The anchor rope AR extends over, and partially circumscribes the first sheave S1 with the first end FE anchored proximate the first end of the third section 3S. The second end SE of the anchor rope AR is anchored at the base section BS at an anchor point.

The second, smaller diameter rope SR, as also illustrated at FIG. 2, includes first and second ends fe, se with the first end fe anchored proximate to the first end of the fourth section 4S of the system. The smaller diameter rope SR passes around the second sheave S2 that is secured proximate to the second end of the third section 3S. Finally, the second end (se) of the second smaller rope SR is anchored proximate to the first end of the second section 2S of the system.

As noted above, the first and second ropes AR, SR in this prior art configuration are of different thicknesses because the tension carried in the larger anchor rope AR is greater than the tension carried in the second smaller rope SR. When larger ropes are required to carry the specified maximum load then the sheaves over which the load carrying ropes run must also have a greater diameter and thickness. Increasing the dimensions of the sheaves and ropes results in a more densely crowded interior of the boom assembly. A more tightly packed set of boom sections is more challenging for initial fabrication as well as to access for repair and replacement of components internal to the telescoping boom assembly and therefore it is highly desirable to reduce the size of ropes, as well as the width and diameter of sheaves, yet maintain a high load carrying capacity. Larger diameter sheaves are required for larger ropes with greater load carrying capacity because larger ropes simply cannot curve around smaller diameter sheaves as readily as smaller ropes. Larger diameter ropes in turn require larger spacing between cross sections.

Figure 3:
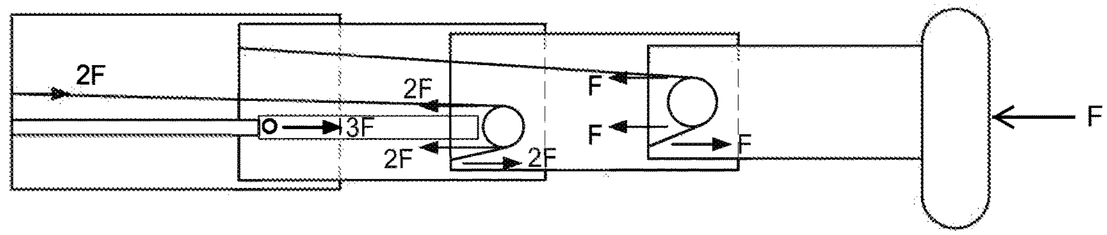
Fig. 3 (PRIOR ART)
FIG. 3 illustrates a sectional view of a prior art four-section telescoping boom with force magnitudes identified on the ropes, sheaves and extension cylinder.

Table 1 and FIG. 3 provide a summary of the forces acting on each element of the previously described prior art telescoping boom assembly. The load for each sheave identifies the load at the anchor point for that specific sheave. As can be seen in Table 1 and FIG. 3, the load on Rope 2 is equivalent to the load applied at the tip (F). The load on Rope 1 is twice the load applied to the tip section. The load on Rope 1 is of particular concern because that rope must have a greater capacity to resist the operating load applied to the tip section of the boom. As previously mentioned, larger ropes require larger sheaves and consume more space in the already limited interior of the boom sections thereby complicating boom section fabrication as well as maintenance and repair operations.

TABLE 1

LOAD FACTORS BY COMPONENT

| No. | Element | Load Factor |
|---|---|---|
| | Operating load applied to the tip section | F |
| 1 | Sheave 1 (left) S1 | 4F |
| 2 | Sheave 2 (right) S2 | 2F |
| 3 | Rope 1 AR | 2F |
| 4 | Rope 2 SR | F |
| 7 | Force required to extend the rod from the cylinder | 3F |

Figure 4:
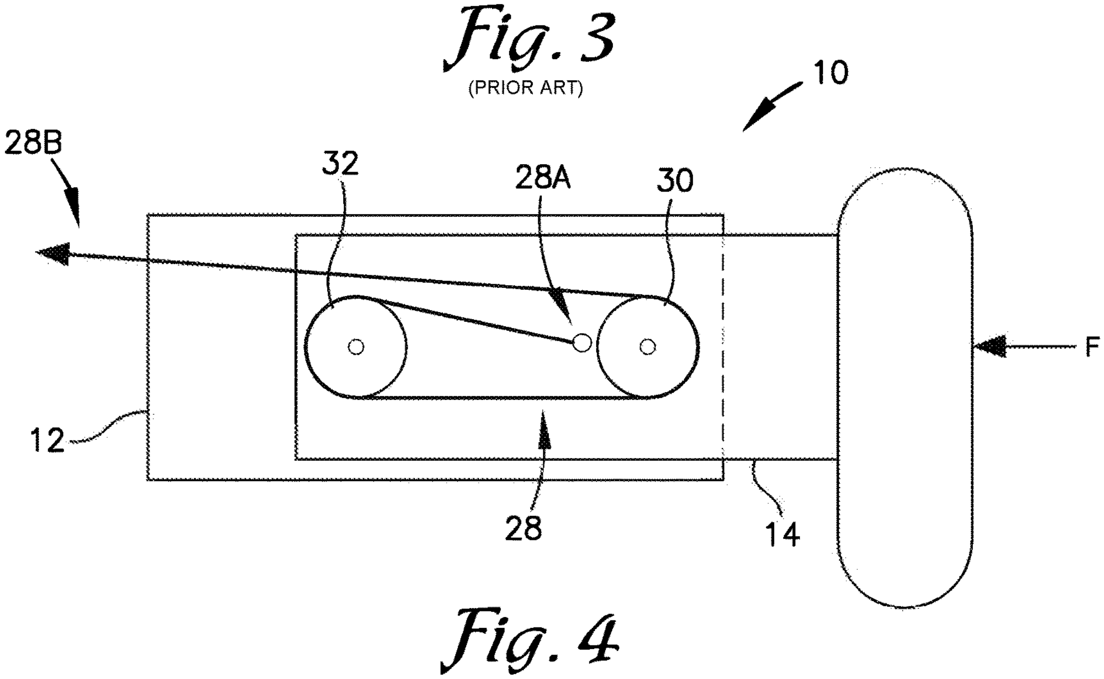
FIG. 4 illustrates a sectional view of an embodiment of two telescoping boom sections.

To comprehend the new boom extension system disclosed herein, one must appreciate the mechanical advantage provided by a block and tackle system. The system 10 as disclosed herein provides considerable mechanical advantage as compared to traditional telescoping boom systems. The telescopic boom system 10 as disclosed herein in its most basic form as illustrated at FIG. 4 includes two boom sections 12, 14.

The system 10 also includes a rope 28 with anchor point 28A that is positioned between the boom sections 12, 14. A first of these boom sections 12 is conceptually fixed (also known as the adjacent section) and the second 14 is extending. The rope 28 is redirected by a first sheave 30 mounted to the adjacent section 12 and is further redirected by a second sheave 32 mounted to the extending section 14. This generalized arrangement of sheaves that directs and then redirects the rope with the sheaves having distinct attachment points provides the mechanical advantage to the multi-section booms that has been missing from prior art designs.

The redirecting of the rope around the sheaves creates what is referred to as parts-of-line (N). The part-of-line term of art requires the counting of the ropes that are either (1) attached to the load or (2) attached to sheaves that translate at the same speed as the load. Each time that the rope 28 is redirected by a sheave the rope experiences an increase in the number of parts-of-line. As the number of the parts-of-line (N) increases, the tensile load in the rope is reduced.

When the tensile load is decreased because the number of parts of line increases the velocity ratio changes requiring the rope to be pulled farther to achieve the desired extension. This ratio is the same ratio as determined by the number of parts of line (N). The objective of the boom designer is to bring the tension in the rope to below the safe tensile limit of the rope but provide the boom crane with the specified lift capacity.

To achieve the desired tension load in the rope 28 which is operable on the extending boom section 14, the number of sheaves attached to each of the extending 14 and adjacent 12 boom sections must be determined. The number of sheaves secured to each section is determined by the formulas:

For $N \geq 2$ $$E = \frac{2(N-1) + 1 + (-1)^N}{4}$$

$$A = \frac{2N + 1 + (-1)^{N+1}}{4}$$

The first end 28A of the rope 28 is anchored to the adjacent section 12 if N is an even number while the first end 28A of the rope 28 is anchored to the extending section 14 if N is an odd number. The second end 28B of the rope 28 is anchored to a section as will be determined below in greater detail.

N=number of parts of line of the rope operable on the extending section

A=number of sheaves mounted to the adjacent section

E=number of sheaves mounted to the extending section

As noted above, the numerical determination of the variables A, E and N is calculated for successive extending and adjacent sections 12, 14 along the entire boom. It should also be understood that the translation of the sheave mounted to the adjacent section 12, by the motive force of, for example a hydraulic cylinder, yields a total telescopic translational force applied to the extending section 14 that is greater than the tension in the rope based upon a multiplication factor equal to the parts-of-line of the system acting on the extending section 14.

It is also important to recognize that the translation of the sheaves mounted to the adjacent section 12 causes the velocity ratio of the extending section 14 relative to the velocity of the adjacent section 12 to be other than 1:1 when compared to the velocity ratio of the second end 28B of the rope 28 relative to the velocity of the extending section 14. This velocity ratio is N:1, where N is the parts-of-line of the system acting on the extending section. A desired velocity ratio may be achieved by anchoring the second end of the rope to a prior section closer to the base section or redirecting the rope between sections to provide the necessary stroke leaving the adjacent section sheave set. Additional detail on the methodology for anchoring the second end of the rope to achieve the desired velocity ratio is discussed below.

Figure 5:
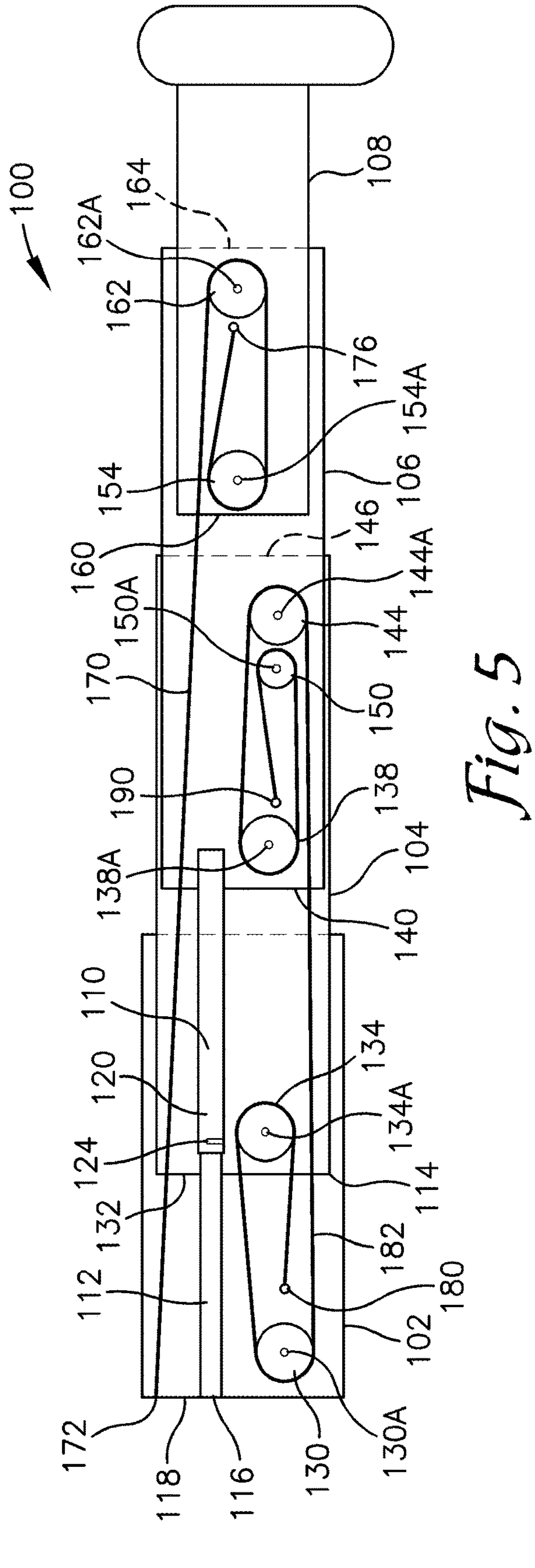
FIG. 5 illustrates a sectional view of an embodiment of a four-section telescoping boom.

An exemplary embodiment of the system 100, as disclosed and illustrated at FIG. 5, is comprised of four telescoping sections 102, 104, 106 and 108. The base section 102 is the section with the largest cross-sectional area and the tip 108 is the section with the smallest cross-sectional area. These boom sections 102, 104, 106 and 108 as with the previously detailed prior art design are preferably fabricated from high strength steel with cross-sectional dimensions ranging from a few inches to greater than sixty inches in some larger cranes.

A hydraulic cylinder 110 with an extensible rod 112 is secured to the first end 114 of the second section 104. A distal end 116 of the extensible rod 112 is anchored to the first end 118 of the base section 102 and the barrel 120 of the hydraulic cylinder 110 is anchored to the first end 114 of the second section 104 at an anchor point 124. As the extensible rod 112 is extended from the barrel 120, the second section 104 telescopes out from the base section 102.

Within this embodiment, all four sections contain at least one sheave and at least one rope traverses through each section 102, 104, 106, 108. In this embodiment as further illustrated at FIG. 5, a first sheave 130 is anchored proximate the first end 118 of the first (base), section 102. A second sheave 134 is anchored proximate to the first end 114 of the second section 104. A third sheave 138 is anchored proximate to the first end 140 of the third section 106 while a fourth sheave 144 is anchored proximate to the second end 146 of the second section 104 and is adjacent to a fifth sheave 150 that is also anchored proximate to the second end 146 of the second section 106. A sixth sheave 154 is anchored proximate the first end 160 of the fourth section 108 and a seventh sheave 162 is anchored proximate to the second end 164 of the third section 106.

Now that the sheave positions have been identified, the orientation of the ropes in this embodiment is discussed. As illustrated at FIG. 5, a first rope 170 is anchored at a first end 172 proximate to the first end 118 of the base section 102. This rope 170 traverses through the base 102, as well as the second and third sections 104, 106. The rope 170 partially circumscribes the seventh sheave 162 and is redirected to the sixth sheave 154 where it partially circumscribes the sixth sheave 154 and terminates at a second end 176 proximate the seventh sheave 162 and is anchored to the third section 106.

Figure 6:
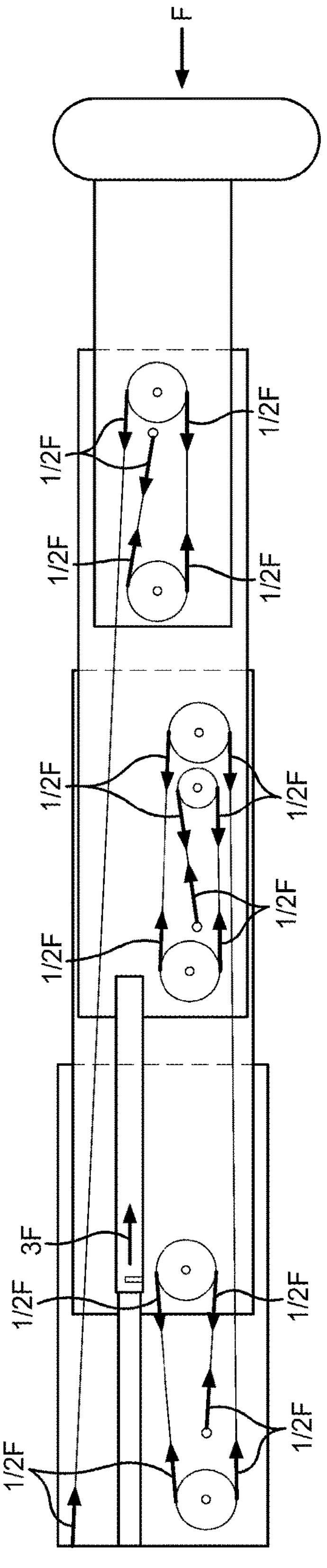
FIG. 6 illustrates a sectional view of an embodiment of a four-section telescoping boom with load factors for sheaves, ropes and extension cylinder.

FIG. 6 illustrates the forces experienced by all ropes and sheave anchors in the embodiment illustrated at FIG. 5. Importantly, the tension within the first rope 170 is only 1/2F. The first end 180 of a second rope 182 is anchored to the base section 102 preferably between the first and second sheaves 130, 134. The second rope 182 extends initially toward the first end 132 of the second section 104 and then is redirected by the first sheave 134 to extend toward the first sheave 130. The second rope 182 then extends away from the first sheave 130 toward the fourth sheave 144. The second rope 182 is then directed around the fourth sheave 144 to the third sheave 138 where it is once again redirected to the fifth sheave 150.

After partially circumscribing the fifth sheave 150 the second rope 182 is anchored at its second end 190 proximate the first end 140 of the third section 106. The maximum tension in the second rope 182 does not exceed 1/2F and therefore a lesser diameter rope 182 internal to the boom assembly is required, and likewise smaller width sheaves that need only accommodate a load of 1/2F are required.

It is possible to reduce the tension in the rope further by adding sheaves to the system and selectively attaching the rope ends to the appropriate anchor points. Referring again to FIGS. 5 and 6, a force F is applied to the tip section 108. There are two parts of line surrounding the sixth sheave 154 resisting this force F at the rear of the tip section 108 so the tension in the tip extend rope 170 is 1/2F and the total load on the rear sheave 154 attached to the tip section is F.

Three parts of line are acting on anchor point 176 and sheave 162 attached to the front end of the third section 106 with each part under a tension load of 1/2F. Therefore, the total force applied to the front sheave 162 and the anchor point 176 is 3/2F. The third sheave 138 at the rear of the third section 106 is resisting this force along with anchor point 180 so the total from this sheave and anchor point must be equivalent to 3/2F. This force is divided into three parts of line therefore the tension in each of the lines is 1/2F.

The tension in the ropes running around the sheaves 144, 150 at the front 146 of the second section 104 must be the same as the tension in the ropes at the rear of the third section 106 which is 1/2F. However, there are now four parts of line coming from this sheave set 144, 150 so the total force applied to the second section 104 is 2F.

Two redirection sheaves 130, 134 are required to provide enough stroke for the third section 106 extend rope 182. These sheaves 130, 134 are attached respectively to the base section 102 and the first end 114 of the second section 104. The tension in these ropes is 1/2F. The anchor point of the redirection sheave 134 at the rear of the second section 104 is resisting a total force of F.

The extend cylinder 110 is resisting all the forces attempting to push the second section 104 into the base section 102. These forces are coming from the second sheave 134 and the sheave set 144, 150 at the front end of the second section 104. The total force applied to the extend cylinder 110 is 2F+F=3F. Table 2 details the loads applied to the sheaves and ropes of the system as disclosed herein and Table 3 provides guidance on the extending section parts of line and the attachment point of the second end of the rope.

TABLE 2

| LOAD FACTORS BY COMPONENT | | |
|---|---|---|
| No. | Element | Load Factor |
| | Operating load applied to the tip section | F |
| 1 | Sheave 130 | F |
| 2 | Sheave 134 | F |
| 3 | Sheave 138 | F |
| 4 | Sheave 150 | F |
| 5 | Sheave 144 | F |
| 6 | Sheave 154 | F |
| 7 | Sheave 162 | F |
| 8 | Rope 170 | 1/2F |
| 9 | Rope 182 | 1/2F |
| 12 | Force required to extend the rod from the cylinder | 3F |
| 13 | Tip Section 108 Extend Force 154A | F |
| 14 | Third Section 106 Retract Forces 162A & 176 | 3/2F |
| 15 | Third Section 106 Extend Forces 138A & 190 | 3/2F |
| 16 | Second Section 104 Retract Forces 134A, 144A & 150A | 3F |
| 17 | Second Section 104 Extend Force 124 | 3F |

While the discussion above details the methodology for determining the number of sheaves for both the extending and the adjacent boom sections there must be a methodology for determining to where the first and second ends of the ropes used for the adjacent and extending sections are to be anchored. Recall that a primary objective of the system 100 as disclosed herein is to lower the tension in the ropes utilized in the boom sections. The boom crane designer knows the maximum load to which he wants the extensible boom crane to be able to lift, what he needs to determine is whether the tension in the rope is below its safe tensile limit.

To accomplish the reduction in tension, additional sheaves around which ropes are redirected thereby are used to create parts-of-line in the sheave and rope system. Recall that determining the number (N) of parts-of-line requires the counting of the ropes that are either (1) attached to the load or (2) attached to sheaves that translate at the same speed as the load. Once the number of parts of line (N) are determined the formulas for A and E can be utilized to calculate the number of sheaves in both the adjacent and extending sections.

What remains to be determined are the locations of anchoring of the first and second ends of the rope used in the adjacent and extending sections under assessment. The location of anchoring of the first end of the rope between the extending and adjacent sections is determined by (N) [number of parts-of-line]. If (N) is an even number, then the first end of the rope is anchored to the extending section. If, however, (N) is an odd number the first end of the rope is anchored to the adjacent section.

The remaining unknown is the location of the anchoring of the second end of the rope that extends beyond the adjacent and extending section. Table 3 references the number of parts-of-line (N). The column to the right in Table 3 allows calculation of the anchor point for the second end of the rope. Table 3 provides that based upon there being two parts of line we are to use the formula "n−3." The variable "n" is in this instance is four (4) because it is the fourth section. The section to which the second end of the extend rope is to be attached is therefore n−3 or 4-3=1. The second end of the rope must be anchored to the first section (the base) to achieve synchronous extension of these boom sections along with the other boom sections of this crane.

A more complicated scenario is a parts-of-line calculation of three (3) in the extending section three (3). Using the formula in the right column of Table 3 yields a n−4 equation or 3-4 equals minus 1. The second end of the rope cannot be anchored to a section with a location of minus nor to a location that is zero. These section numbers do not exist.

The second end of the rope must be redirected by a sheave in the base section (section 1) and a sheave in section number 2 back to anchor to the first end of the base section to satisfy the anchor requirements. To be clear on this, the second end cannot be anchored at the base section because the formula dictates that the second end must be redirected by at least two sections to get past minus one and zero which are imaginary and therefore boom sections to which anchoring cannot occur.

TABLE 3

| EXTENDING SECTION PARTS OF LINE AND ATTACHMENT POINT | |
|---|---|
| Parts of line in sheave set of extending section | Section to which second end of extend rope must attach assuming section "n" is the extending section |
| 1 | n-2 |
| 2 | n-3 |
| 3 | n-4 |
| 4 | n-5 |

Example 1

The formulas set forth in the paragraphs above are to be utilized for any two adjacent sections of the boom wherein the inner section is extending by ropes to determine the number of sheaves mounted to the two adjacent sections. This should not be confused with the applicability of this formula to sections not extended by the ropes, i.e., the sections directly attached to the cylinder. Presuming a five-section crane is undergoing design and the rope under consideration has a safe tensile limit of 20,000 pounds. The extensible boom crane; however, has an operational capacity of 60,000 pounds.

To reduce the operational tension on the fifth section rope to no greater than 20,000 pounds then the rope in that section must have at least three parts of line (N=3). Three parts of line reduces the tension in the applicable rope from the crane operational load of 60,000 pounds to 20,000 pounds. Using the two formulas referenced above, the number of sheaves "E" mounted to the fifth section equals 1; however, the number of sheaves "A" mounted to the fourth section (the extending section) equals 2. These numerical tools allow the crane designer to determine how best to size the rope and incorporate the appropriate number, and load capacity of sheaves, to achieve the desired operational capabilities for an extensible crane.

Example 2

A designer developing a six-section extensible boom with an operational capacity of 80,000 pounds seeks to employ rope with a 20,000-pound tensile load limit. To reduce the tensile loading of the rope in the fifth extensible section to no greater than 20,000 pounds requires four parts of line (N=4). Utilizing the formulas set forth above, the output of the equation for "A" yields a value of 2 and the output of the equation for "E" also yields a value of 2. Consequently, two sheaves are required in both the adjacent and extending sections of the boom to reduce the tensile load in the rope to the appropriate level.

The number and location of sheaves determined for use in the various sections of an extensible boom while moderating the load carried by the ropes does impact the velocity of extension of the boom sections. The translation of the sheaves mounted to the adjacent section causes the velocity ratio of the extending section relative to the velocity of the adjacent section to be other than 1:1 when compared to the velocity ratio of the second end of the rope relative to the velocity of the adjacent section.

This velocity ratio is determined by the number of parts-of-line (N) and numerically the velocity ratio is N:1. The velocity ratio for synchronous extension of the telescopic boom sections is achieved by anchoring or redirecting the rope around at least one of a redirection sheave, a pulley, or a pin mounted to a prior operatively connected section of the boom as detailed at Table 3.

Example 3

Figure 7:
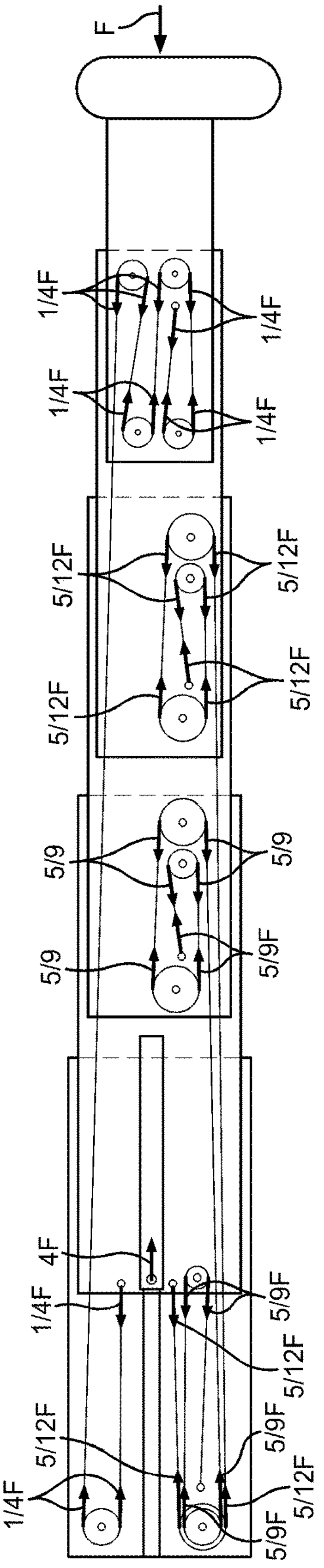
FIG. 7 illustrates a sectional view of an embodiment of a five-section telescoping boom with load factors for sheaves, ropes and extension cylinder.

To further illustrate the advantages of this innovative method of deploying sheaves and ropes to achieve optimal mechanical advantage, FIG. 7 illustrates an embodiment of a five-section boom comprised of a base section, three intermediate sections and a tip section. With a force F applied to the tip section, the greatest tension in any rope segment, due to the inclusion of multiple sheaves disbursed throughout the various sections with functionally appropriate anchor points does not produce a rope tension exceeding 5/9F, i.e., a fraction of F, the load being applied at the tip section. The loads experienced by all ropes, sheave anchor points and the extension cylinder are detailed in FIG. 7.

Figure 8:
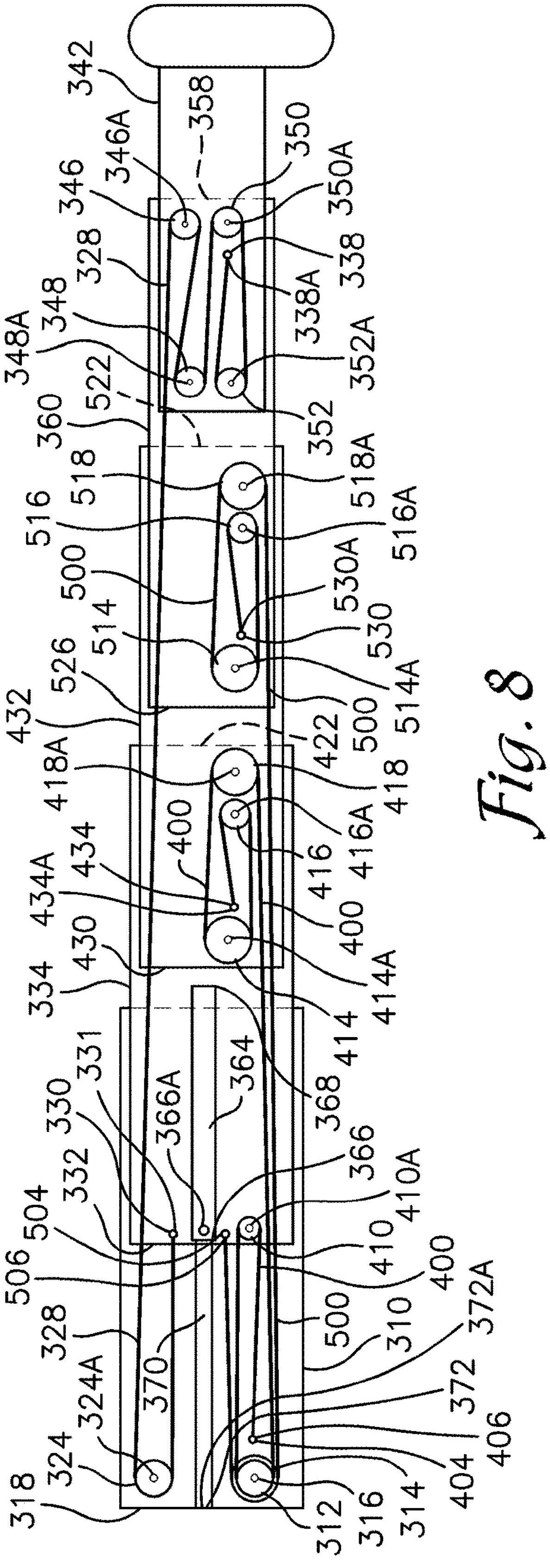
FIG. 8 illustrates a sectional view of an embodiment of a five-section telescoping boom.

FIG. 8 illustrates the same five-section boom embodiment shown in FIG. 7 with reference numbers utilized instead of load factors. FIG. 8 represents an exemplary configuration of a five-section boom. There are an immense number of boom rope and sheave configurations that are possible utilizing the system as disclosed herein. These configurations are based upon the boom designer's interest in managing the load in the rope as well as managing space in the boom sections. While FIGS. 7 and 8 are instructive, they should not be considered limiting in terms of the full scope of rope and sheave configurations that are contemplated by this disclosure.

As illustrated at FIG. 8, the base section 310 includes a double sheave 312, 314 secured at an anchor point 316 proximate the first end 318 of the base section 310. The two sheaves 312, 314 while anchored at one point 316 are configured to redirect two separate ropes using two separate grooves on the double sheave 312, 314. These sheaves 312, 314 while positioned side-by-side are unattached and separately rotatable upon on a single axle and are therefore capable of operating at different rotational speeds. A second sheave 324 is also anchored near the first end 318 of the base section 310 at anchor point 324A.

The driving force for this five-section boom is a hydraulic cylinder 364 having first and second ends 366, 368. Extending from the hydraulic cylinder 364 is a piston 370 with a distal end 372. The first end 366 of the hydraulic cylinder 364 is anchored 366A proximate to the first end 332 of the second section 334 while the second end 368 of the hydraulic cylinder 364 is unanchored. The distal end 372 of the hydraulic piston 370 is anchored at anchor point 372A proximate to the first end 318 of the first section 310.

As the boom operator seeks to extend the boom sections, hydraulic fluid is routed to the hydraulic cylinder 364 causing it to extend the piston 370. As the distal end 372 of the piston 370 is extended, it pushes against the first end 318 of the base section 310 causing the cylinder 364 which is anchored proximate to the first end 332 of the second section 334 to extend outwardly from the base section 310. This outward extension of the second section 334 also causes the separation of sheaves 410 and 312 pulling on the first rope 400 anchor 404.

The second end 404 of the first rope 400 is anchored at an anchor point 406 proximate the double sheave 312, 314. The first rope 400 is redirected by a sheave 410 anchored to the first end 332 of the second section 334 at anchor point 410A. After partially circling the sheave 410 the first rope 400 extends around the smaller sheave 312 and then forward to a collection of three sheaves 414, 416 and 418.

The three sheaves are anchored at anchor points 414A, 416A and 418A. The first rope 400 extends around sheave 418 that is anchored to the second section 334 proximate the second end 422 of the second section 334. Upon being redirected by this first sheave 418, the first rope 400 traverses to the second sheave 414 which is anchored proximate to the first end 430 of the third section 432. After traversing to and being redirected by the third sheave 416, which is also anchored proximate to the second end 422 of the second section 334, the first end 434 of the first rope 400 is anchored to the third section 432 at an anchor point 434A in proximity to the first sheave 414.

As the hydraulic cylinder 364 extends the piston 370 outward, the first rope 400 due to the connection at the anchor point 406 at the first end 318 of the base section 310 pulls the third section 432 forward because the separation of sheaves 312 and 410. Recall that the second section 334 is already extending outward because the hydraulic cylinder 364 is anchored to the first end 332 of the second section 334 and it moves in unison with the hydraulic cylinder 364.

The boom system as disclosed herein utilizes a second rope 500 with first and second ends 530, 504. This second rope 500 is operable to extend the fourth section 360. The second end 504 of the second rope 500 is anchored at anchor point 506 proximate the first end 332 of the second section 334. The second rope 500 traverses the second coaxial sheave 314 anchored in the base section 310 and then traverses to a three-set sheave 514, 516, 518 that are anchored at anchor points 514A, 516A, 518A. The second rope 500 first partially circumscribes the third sheave 518 that is anchored proximate to the second end 522 of the third section 432.

After partially circumscribing the third sheave 518, the second rope 500 then traverses to the first sheave 514 that is anchored proximate to the first end 526 of the fourth section 360. Upon partially circumscribing the first sheave 514 the rope then traverses to the second sheave 516 that is anchored to the third section 432 at anchor point 516A between the first and third sheaves 514, 516. After partially circumscribing the second sheave 516 the first end 530 of the second rope 500 is anchored proximate to the first end 526 of the fourth section 532 at anchor point 530A.

As the hydraulic cylinder 364 extends the piston 370 outward the second end 504 of the third rope 500 is moved forward thereby pulling the rope 500 around the sheave 314 mounted to the base section 310. As the second rope 500 traverses around the three sheaves 514, 516, 518 the first end 530 of the second rope 500 which is anchored to the fourth section 360 pulls the fourth section 360 forward. Recall the third section is already translating forward due to the first rope 400 and the extension of the hydraulic cylinder 364. Synchronous extension with the other two sections 334, 342 is achieved through the hydraulic cylinder 364 extension by the second rope 500 anchor point 504 as well as the translation of sheaves 516 and 518 due to the translation of the third section 432 by the first rope 400.

The exemplary five-section boom system as disclosed herein also utilizes a third rope 328 that includes a first end 338 and a second end 330. The third rope 328 has a second end 330 anchored to the first end 332 of the second section 334. The third rope 328 is then redirected around sheave 324 anchored at point 324A at the first end 318 of the base section 310. The first end 338 of the third rope 328 upon being redirected around second sheave 324 is routed through all boom sections to the tip section 342 where it is redirected by four sheaves 346, 348, 350, 352 that are anchored respectively at anchor points 346A, 348A, 350A and 352A. Two of the sheaves 348, 352 are anchored to the tip section 342 while two sheaves 346, 350 are anchored to the fourth section 360. After being redirected by sheave 352, the first end 338 of the third rope 328 is anchored proximate to the second end 358 of the fourth section 360.

Because the second end 330 of the third rope 328 is anchored proximate to the first end 332 of the second section 334, the second section 334 pulls the third rope 328 attachment point 331 and the second end 330 of the third rope 328 forward when extended by the hydraulic cylinder 364. Because the first end 338 of the first rope 328 is anchored proximate to the second end 358 of the fourth section 360, the translation of the fourth section 360 by the second rope 500 also causes the tip section 342 to extend. Consequently, under the sheave and rope configuration disclosed in this example as illustrated at FIG. 8, the extension of the hydraulic cylinder 364 causes the third rope 328 to produce outward movement of the tip section 342 as well.

As previously detailed at FIG. 7, none of the ropes in this five-section boom experience a load greater than 5/9F which is the load on the first rope 400 in the third section 432 that is redirected by sheaves 414, 416 and 418 and anchored at anchor point 434A. The three parts-of-line (N) in this first rope 400 within section three 432 provide considerable mechanical advantage and reduces the tension to 5/9F from a rope load of 5/3F due to the existence of three parts-of-line.

Because there are three parts of line (N) in this extending section the formula above in Table 3 is used and the formula is n−4, wherein "n" is the number of the extending section, in this instance section three 432, so the second end 404 of the rope 400 must attach to section "minus one;" however, there is no "minus one" section nor is there a "zero" section. The procedure to address that mathematical disparity is to redirect the rope 400 as was done with sheave 312 and one additional time around sheave 410 attached to the second section 334. The redirecting sheave 410 effectively accounts for another section and allows the second end 404 of the rope 400 to be anchored to the base section 310 at anchor point 406.

The rope 500 in the fourth section 360 is potentially subject to a load of 5/4F and as with the third section, there are, however, three parts of line (N) due to there being three sheaves 514, 516, 518 redirecting the rope resulting in a load reduction to 5/12F. Without the three parts of line (N) the second rope 500 would experience a load of 5/4F and therefore require a rope with a higher breaking strength and of larger diameter. An undesirable tradeoff. Again, using the formula of n−4 in Table 3 above, and "n" is now the fourth section so application of the formula results in a value of zero. Since there is no section "zero" the second rope 500 is redirected forward using sheave 314 with the second end 504 of the rope 500 being anchored at anchor point 506 proximate the first end 332 of the second section 334.

With the tip section 342, the third rope 328 tension is potentially subject to a load of F but because there are four parts of line (N) that reduces the load F applied to the tip rope 328 to just 1/4F. Resorting again to the formula in Table 3, with four parts of line (N) the formula for determining the connection point of the rope is n−5. Since n=5 the formula yields a value of "zero." This is the same outcome as experienced in the paragraph above for the second rope 500 and the fourth section 432. Since there is no section "zero" the third rope 328 is redirected forward using sheave 324 with the second end 330 of the rope 328 being anchored at anchor point 331 proximate the first end 332 of the second section 334.

It is quite conceivable that, for example, a lesser or greater number of sheaves could have been employed in any of the five sections to either increase or decrease the tension in the ropes. The formulas for "A" and "E" outlined above provide the methodology to determine the required number of sheaves based upon the number of parts of line. The number of sheaves employed as well as the rope/sheave diameters are dictated by the designer of the extensible boom and are just a subset of the overall extensible boom design considerations.

Additionally, the point of attachment of the second ends of the extension ropes of the boom utilizing the criteria set forth in Table 3 has been extensively expounded upon in the immediately preceding discussion. Finally, as disclosed herein, the first end of the rope in the extending section is anchored to the adjacent section if the number of parts of line (N) is an even number while the first end of the rope is anchored to the extending section if (N) is an odd number.

In Example 3 above, with the five-section boom, because section three 432 utilizes three parts of line (N) the anchor point 434A for the first end 434 of the first rope 400 is to the extending section 432. Two sheaves 416, 418 are attached to the adjacent section 334 while the third sheave 414 is attached to the extending section 432. Likewise, with section four 360, there are also three parts of line (N) and the anchor point 530A for the first end 530 of the second rope 500 is also to the extending section 360. Two sheaves 516, 518 are attached to the adjacent section 432 while the third sheave 514 is anchored to the extending section 360.

The tip section 342 incorporates four parts of line and as referenced immediately above, when there are an even number of parts of line in a section, the first end 338 of the third rope 328 is anchored to the adjacent section 360, in this example at anchor point 338A. As previously discussed, the tip section 342 employs a total of four sheaves 346, 348, 350, 352. Two of those sheaves 346, 350 are anchored to the adjacent section 360 while two of the sheaves 348, 352 are anchored to the extending section 342.

The methodologies as outlined above yield a system that is capable of increased load capacity for the same size of rope diameter and sheave width as extensible boom systems that are currently employed. Consequently, an extensible boom designer may elect to specify a larger load capacity for the extensible boom or reduce the rope diameter and cross-sectional dimension of the boom sections and maintain a similar load capacity.

The disclosed apparatus, and systems should not be construed as limiting in any way. Instead, the present disclosure is directed toward all novel and nonobvious features and aspects of the various disclosed embodiments, alone and in various combinations and sub-combinations with one another. The disclosed apparatus and systems are not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. A system for design of a synchronous rope extended telescoping boom, the system comprising:

a base section, a rope extended tip section, and at least one rope extended boom section disposed between the base section and the tip section, each section further comprising an open interior space;

an extensible power source disposed within the open interior space of the base section for translating the rope telescoping boom sections, the power source comprising a first end and a second end, wherein the first end of the power source is anchored to the base section and the second end of the power source is anchored to a boom section that is not rope extended;

at least one rope operable upon each rope extended section of the telescopic boom, the at least one rope disposed within the open interior space and comprising a first end and a second end;

the first and second ends of the at least one rope anchored within the open interior space to achieve synchronous extension of all rope extended sections of the extensible telescopic boom;

at least one sheave anchored within the open interior space of the synchronously extensible telescoping boom to achieve an increase in a parts-of-line and thereby lower the tension in the at least one rope; wherein, a number of sheaves required in each rope extended section of the telescopic boom as well as a boom section adjacent to each rope extended section of the telescopic boom is determined through utilization of the following equations, For $N \geq 2$ $$E = \frac{2(N-1)+1+(-1)^N}{4}$$

$$A = \frac{2N+1+(-1)^{N+1}}{4}$$

wherein,

N=number of parts of line operable on the rope extended boom section,

A=number of sheaves mounted to boom section adjacent the rope extended boom section, and E-number of sheaves mounted to the rope extended boom section; wherein the anchorage of the first end of the at least one rope is an anchor point on the adjacent boom section if the number of parts-of-line N is an even number and an anchor point on the extending boom section if the number of parts-of-line Nis an odd number, wherein of the anchorage of the second end of the at least one rope to a boom section is determined through solution of the equation n–(N+1) wherein, the variable n represents the total number of boom sections with solutions of either zero or a negative value rerouted forward into the boom or redirected by sheaves.

2. A method for synchronous extension of a telescoping boom, the method comprising:

assembling telescoping boom sections to include a base section, a tip section and at least one boom section disposed between the base section and the tip section, each telescoping boom section comprising an open interior space;

an extensible power source disposed within the open interior space of the base section for translating the plurality of rope extended boom sections, the power source comprising a first end and a second end, wherein the first end of the power source is anchored to the base section and the second end of the power source is anchored to a section that is not rope extended;

calculating a number of sheaves required in each rope extended section as well as a section adjacent the rope extended section to reduce the tensile load of each respective rope below a maximum tensile load of the rope;

For $N \geq 2$ $$E = \frac{2(N-1)+1+(-1)^N}{4}$$

$$A = \frac{2N+1+(-1)^{N+1}}{4}$$

in the formulas:

N is a number of parts-of-line in a sheave set in each rope extended section;

A is a calculated number of sheaves; mounted to the section adjacent the rope extended section; and E is a calculated number of sheaves in mounted to the rope extended section;

installing a plurality of ropes each with a first end and a second end within the open interior space, each rope operable to rope extend only one section with multiple parts-of-line extending between each rope extended section and the section adjacent each rope extended section of the boom; wherein, at a first step, anchoring the first end of each of the extend ropes at the adjacent boom section if N for the rope is an even number and to the rope extended boom section if N is an odd number; and at a second step, anchoring the second end of the extend rope to the section calculated from the formula n–(N+1) to include redirection of the extend rope by additional sheaves should a value of zero or less result from application of the formula.

3. A method for synchronous extension of a rope extended telescoping boom, the rope extended telescoping boom comprising:

a base section, a rope extended tip section and at least one section disposed between the base section and the tip section, each telescoping boom section comprising an open interior space;

an extensible power source disposed within the open interior space of the base section for translating a plurality of rope extended sections, the power source comprising a first end and a second end, wherein the first end of the power source is anchored to the base section and the second end of the power source is anchored to section that is not rope extended; and at least one rope operable upon each rope extended section of the telescoping boom, the at least one rope disposed within the open interior space and comprising a first end and a second end, the at least one rope further comprising a maximum tensile strength; and the method comprising:

at a first step, to avoid exceeding the maximum tensile strength of the at least one rope, calculating a number of sheaves installed in all rope extended and sections adjacent the rope extended sections of the telescopic boom through application of the formulas:

For $N \geq 2$ $$E = \frac{2(N-1)+1+(-1)^N}{4}$$

$$A = \frac{2N+1+(-1)^{N+1}}{4}$$

in the formulas:

N is a number of parts-of-line in a sheave set in each rope extended section;

A is a calculated number of sheaves mounted to the section adjacent to the rope extended section; and E is a calculated number of sheaves in the rope extended section;

at a second step, installing a plurality of ropes each with a first end and a second end within the open interior space, each rope operable to extend only one section with multiple parts-of-line extending between each of the rope extended sections and the sections adjacent to the rope extended sections; and at a third step, anchoring of the first end of each of the plurality of ropes to the section adjacent the rope extended section if N for the rope is an even number and to the rope extended section if N is an odd number; and at a fourth step, anchoring the second end of the extend rope to the boom section calculated from the formula n−(N+1) where n is the rope extended section to include redirection of the extend rope by additional sheaves should a value of zero or less result from application of the formula.

* * * * *